United States Patent
Tseng et al.

(10) Patent No.: US 7,602,291 B2
(45) Date of Patent: *Oct. 13, 2009

(54) METHOD AND SYSTEM FOR VERIFYING AUTHENTICITY OF AN OBJECT

(75) Inventors: Yin-Hung Tseng, Chiayi (TW); Sheng-Chun Hsu, Taitung Hsien (TW)

(73) Assignee: Userstar Information System Co., Ltd., Chiayi (TW)

( * ) Notice: Subject to any disclaimer, the term of this patent is extended or adjusted under 35 U.S.C. 154(b) by 364 days.

This patent is subject to a terminal disclaimer.

(21) Appl. No.: 11/520,706

(22) Filed: Sep. 14, 2006

(65) Prior Publication Data

US 2008/0079535 A1   Apr. 3, 2008

(51) Int. Cl.
*G08B 13/14* (2006.01)
(52) U.S. Cl. .............. 340/572.1; 340/572.4; 340/572.7; 340/572.8; 340/5.8; 340/5.26; 340/5.61; 340/10.1
(58) Field of Classification Search .............. 340/572.1, 340/572.4, 572.7, 572.8, 5.8, 5.26, 5.61, 340/10.1
See application file for complete search history.

(56) References Cited

U.S. PATENT DOCUMENTS

| 2002/0005774 A1* | 1/2002 | Rudolph et al. ............ 340/5.61 |
| 2003/0159036 A1 | 8/2003 | Walmsley et al. |
| 2005/0049979 A1 | 3/2005 | Collins et al. |
| 2007/0294528 A1* | 12/2007 | Shoji et al. .................. 713/159 |
| 2008/0106371 A1* | 5/2008 | Tseng et al. .................. 340/5.8 |

FOREIGN PATENT DOCUMENTS

GB   2 431 545 A   4/2007

(Continued)

OTHER PUBLICATIONS

Damith C. Ranasinghe et al., "Security and Privacy Solutions for Low-Cost RFID Systems", Dec. 14, 2004, Intelligent Sensors, Sensor Networks and Information Processing Conference, 2004, Proceedings of the 2004 Melbourne Australia Dec. 14-17, 2004, Piscataway NJ USA, IEEE, pp. 337-342, XP010783788, ISBN: 978-0-7803-8894-9.

(Continued)

*Primary Examiner*—Tai T Nguyen
(74) *Attorney, Agent, or Firm*—Stephen A. Bent; Foley & Lardner LLP

(57) ABSTRACT

A method for verifying authenticity of an object includes the steps of: enabling an electronic device to generate and transmit a request signal; in response to the request signal, enabling an RFID tag to generate a first authentication code based on a varying secret key, a second authentication code based on a unique identification code of the RFID tag and the varying secret key, and a third authentication code that is based on the unique identification code of the RFID tag and the first and second authentication codes, and to wirelessly transmit the third authentication code for reception by the electronic device; and enabling the electronic device to forward the third authentication code received from the RFID tag to an authenticating center for verification. A system, which includes the RFID tag, the electronic device, and the authenticating center, and which performs the method is also disclosed.

23 Claims, 6 Drawing Sheets

FOREIGN PATENT DOCUMENTS

| | | |
|---|---|---|
| WO | WO 2004/088579 A1 | 10/2004 |
| WO | WO 2005/106807 A1 | 11/2005 |
| WO | WO 2006/030344 A1 | 3/2006 |
| WO | WO 2007/056620 A1 | 5/2007 |
| WO | WO 2007/068519 A2 | 6/2007 |
| WO | WO 2007/113040 A1 | 10/2007 |

OTHER PUBLICATIONS

T. Staake et al., "Extending the EPC Network—the Potential of RFID in Anti-Counterfeiting", Mar. 13, 2005, Proceedings ACM SAC, XX, XX, pp. 1607-1612, XP002397697.

Ari Juels et al., "Strengthening EPC Tags Against Cloning", Sep. 2, 2005, WISE. Proceedings of the 2005 ACM Workshop on Wireless Security. Cologne, Germany, Sep. 2, 2005 [Proceedings of the ACM Workshop on Wireless Security], New York, NY: ACM US, pp. 67-75, XP001508054, ISBN: 978-1-59593-142-9.

Stephen A. Weis et al., "Security and Privacy Aspects of Low-Cost Radio Frequency Identification Systems", Lecture Notes in Computer Science, Springer Verlag, Berlin, DE, vol. 2802, Jan. 27, 2004, pp. 201-212, XP002397694, ISSN: 0302-9743.

* cited by examiner

METHOD AND SYSTEM FOR VERIFYING AUTHENTICITY OF AN OBJECT

BACKGROUND OF THE INVENTION

1. Field of the Invention

The invention relates to a method and system for verifying authenticity of an object, more particularly to a method and system for verifying authenticity of an object with the use of a varying secret key.

2. Description of the Related Art

In U.S. Patent Application Publication No. 20020005774, there is disclosed a conventional system for verifying authenticity of a product. The conventional system includes a radio frequency identification (RFID) tag that has an encrypted code and that is associated with the product, and an RFID tag reader that is operable so as to read the encrypted code of the RFID tag and so as to forward the encrypted code to an authentication engine for validation.

The conventional system is disadvantageous in that, since the encrypted code of the RFID tag is fixed, the conventional system is prone to fraud.

U.S. Patent Application Publication No. 20050071231 proposes a system that addresses the problem in the aforementioned conventional system. The proposed system includes a RFID tag, an RFID reader, and an authorizing entity. The RFID tag is associated with the product. The RFID reader is operable so as to generate an interrogation signal. The RFID tag, in response to the interrogation signal, and generates and transmits a random number. The RFID reader is further operable so as to forward the random number to the authorizing entity for validation.

Although the proposed system achieves its intended purpose, the authorizing entity validates the random number from the RFID reader against information stored in a database thereof. Unauthorized access to the database makes the proposed system prone to fraud.

SUMMARY OF THE INVENTION

Therefore, the object of the present invention is to provide a method and system for verifying authenticity of an object while ensuring security of transaction.

According to one aspect of the present invention, a method for verifying authenticity of an object is to be implemented using a system that includes a radio frequency identification (RFID) tag associated with the object, an electronic device, and an authenticating center, and comprises the steps of: enabling the electronic device to generate and wirelessly transmit a request signal; in response to the request signal, enabling the RFID tag to generate a first authentication code based on a varying secret key, a second authentication code based on a unique identification code of the RFID tag and the varying secret key, and a third authentication code that is based on the unique identification code of the RFID tag and the first and second authentication codes, and to wirelessly transmit the third authentication code for reception by the electronic device; and enabling the electronic device to forward the third authentication code received from the RFID tag to the authenticating center for verification.

According to another aspect of the invention, a system for verifying authenticity of an object comprises a radio frequency identification (RFID) tag, an electronic device, and an authenticating center. The RFID tag is associated with the object and has a unique identification code. The electronic device is operable so as to generate and wirelessly transmit a request signal. The RFID tag, in response to the request signal, generates a first authentication code based on a varying secret key, a second authentication code based on a unique identification code of the RFID tag and the varying secret key, and a third authentication code that is based on the unique identification code of the RFID tag and the first and second authentication codes, and wirelessly transmits the third authentication code for reception by the electronic device. The electronic device forwards the third authentication code received from the RFID tag to the authenticating center for verification.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
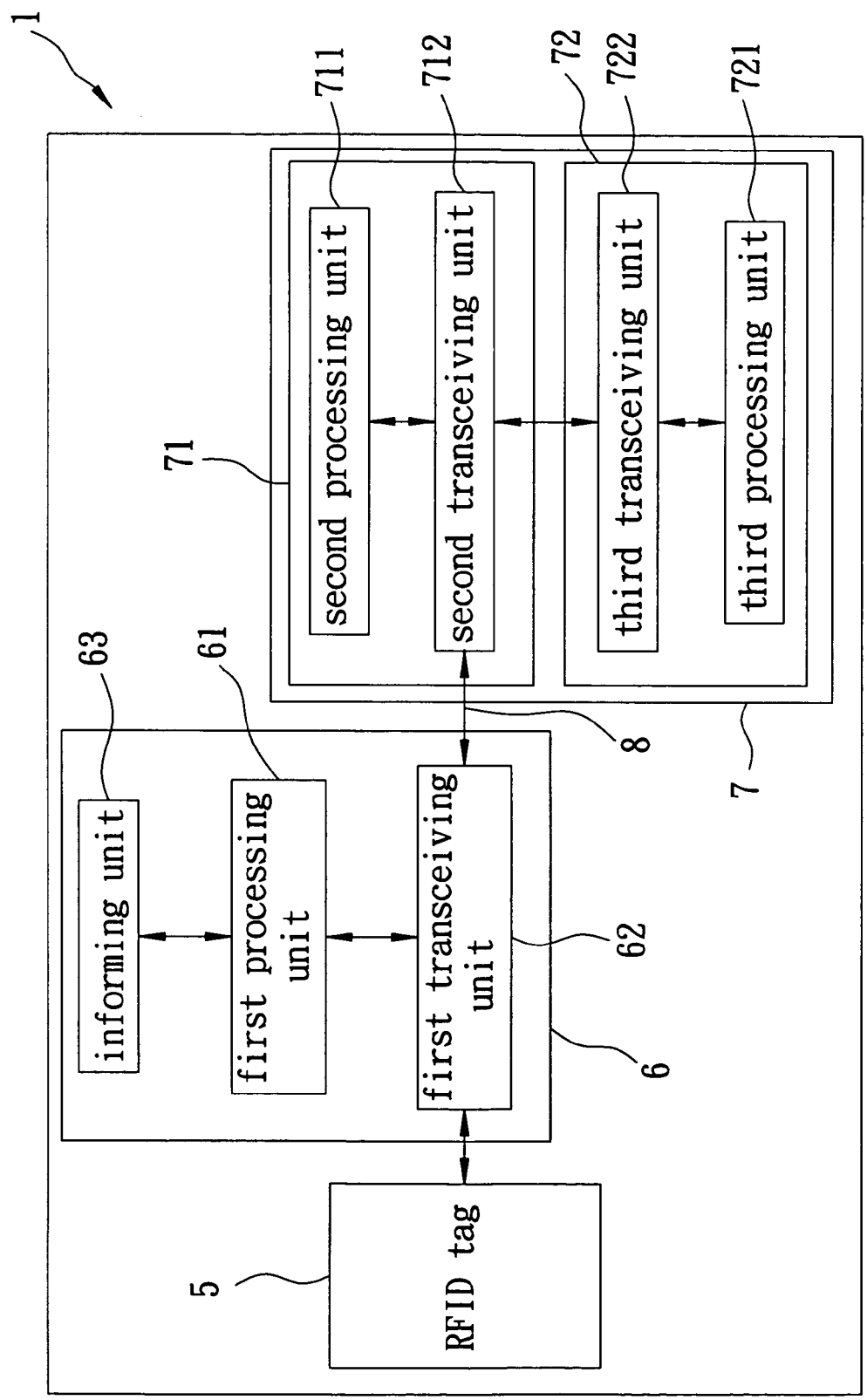
FIG. 1 is a block diagram of the first preferred embodiment of a system for verifying authenticity of an object according to the present invention.

Before the present invention is described in greater detail, it should be noted that like elements are denoted by the same reference numerals throughout the disclosure.

Referring to FIGS. 1 and 2, the first preferred embodiment of a system 1 for verifying authenticity of an object (not shown) according to this invention is shown to include a radio frequency identification (RFID) tag 5, an electronic device 6, and an authenticating center 7.

In this embodiment, the RFID tag 5 is associated with the object and has a unique identification code.

The electronic device 6 includes a first processing unit 61 that is operable so as to generate a request signal, and a first transceiving unit 62 that is coupled to and that is controlled by the first processing unit 61 of the electronic device 6 to wirelessly transmit the request signal.

The RFID tag 5, in response to the request signal, generates a varying secret key, a first authentication code based on the varying secret key, a second authentication code based on the unique identification code of the RFID tag 5 and the varying secret key, and a third authentication code that is based on the unique identification code of the RFID tag 5 and the first and second authentication codes, and wirelessly transmits the third authentication code for reception by the electronic device 6.

The first processing unit 61 of the electronic device 6 further controls the first transceiving unit 62 of the electronic device 6 to forward the third authentication code received from the RFID tag 5 to the authenticating center 7 for verification.

The authenticating center 7 includes first and second authenticating devices 71, 72. The first authenticating device 71 of the authenticating center 7 is located at a service provider (not shown) that administers the system 1 of this invention. The second authenticating device 72 of the authenticating center 7 is located at a manufacturer (not shown) of the object.

The first authenticating device 71 of the authenticating center 7 includes a second processing unit 711, and a second transceiving unit 712 that is coupled to and that is controlled by the second processing unit 711 of the first authenticating device 71 to forward the third authentication code received from the electronic device 6 to the second authenticating device 72.

The second authenticating device 72 of the authenticating center 7 includes a third processing unit 721, and a third transceiving unit 722. The third processing unit 721 of the second authenticating device 72 executes an algorithm so as to determine the unique identification code of the RFID tag 5 and the first and second authentication codes from the third authentication code forwarded by the first authenticating device 71, so as to generate a verifying code that is based on two of the unique identification code of the RFID tag 5 and the first and second authentication codes, and so as to compare the verifying code with the remaining one of the unique identification code of the RFID tag 5 and the first and second authentication codes in order to verify authenticity of the object. The third transceiving unit 722 of the second authenticating device 72 is coupled to and is controlled by the third processing unit 721 of the second authenticating device 72 to forward the comparison result to the first authenticating device 71.

The second processing unit 711 of the first authenticating device 71 of the authenticating center 7 further controls the second transceiving unit 712 of the first authenticating device 71 to forward the comparison result to the electronic device 6.

The electronic device 6 further includes an informing unit 63 that is coupled to and that is controlled by the first processing unit 61 of the electronic device 6 to inform the comparison result forwarded by the first authenticating device 71 of the authenticating center 7 to a user (not shown). In this embodiment, the informing unit 63 of the electronic device 6 includes a liquid crystal display (not shown) that shows the comparison result in the form of a text message or a graphical message or both. In an alternative embodiment, the informing unit 63 of the electronic device 6 includes a light-emitting diode (not shown) that emits light of different colors, each of which is indicative of the comparison result. For example, when the light-emitting diode of the informing unit 63 emits a green light, this indicates that the comparison result verifies the object as authentic. On the other hand, when the light-emitting diode of the informing unit 63 emits a red light, this indicates that the comparison result verifies the object as counterfeit.

It should be noted herein that informing the comparison result to the user could be conducted through other means not limited to the informing unit 63. In one embodiment, the electronic device 6 is operable in a forward mode, where the electronic device 6 forwards the comparison result to a preset email account of the user automatically. In another embodiment, the electronic device 6 is operable in an upload mode, where the electronic device 6 uploads the comparison result to an Internet website automatically. In yet another embodiment, the electronic device 6 is operable in a fax mode, where the electronic device 6 sends the comparison result to a preset facsimile machine of the user automatically.

In this embodiment, the first transceiving unit 62 of the electronic device 6 forwards the third authentication code to and receives the comparison result from the second transceiving unit 712 of the first authenticating device 71 of the authenticating center 7 via a wireless connection 8. Preferably, the wireless connection 8 is one of an Internet connection, a short message service, a global system for mobile communications (GSM) connection, a general packet radio service (GPRS) connection, and a wireless fidelity (Wi-Fi) connection. In an alternative embodiment, the first transceiving unit 62 of the electronic device 6 forwards the third authentication code to and receives the comparison result from the second transceiving unit 712 of the first authenticating device 71 of the authenticating center 7 via a wired connection 8, such as an Ethernet or bus connection.

In an alternative embodiment, the authenticating center 7 is dispensed with the second authenticating device 72. The second processing unit 711 of the first authenticating device 71 is operable so as to determine the unique identification code of the RFID tag 5 and the first and second authentication codes from the third authentication code forwarded by the electronic device 6, so as to generate the verifying code that is based on two of the unique identification code of the RFID tag 5 and the first and second authentication codes, and so as to compare the verifying code with the remaining one of the unique identification code of the RFID tag 5 and the first and second authentication codes. The second transceiving unit 712 of the first authenticating device 71 is coupled to and is controlled by the second processing unit 711 of the first authenticating device 71 to forward the comparison result to the electronic device 6.

Figure 2A:
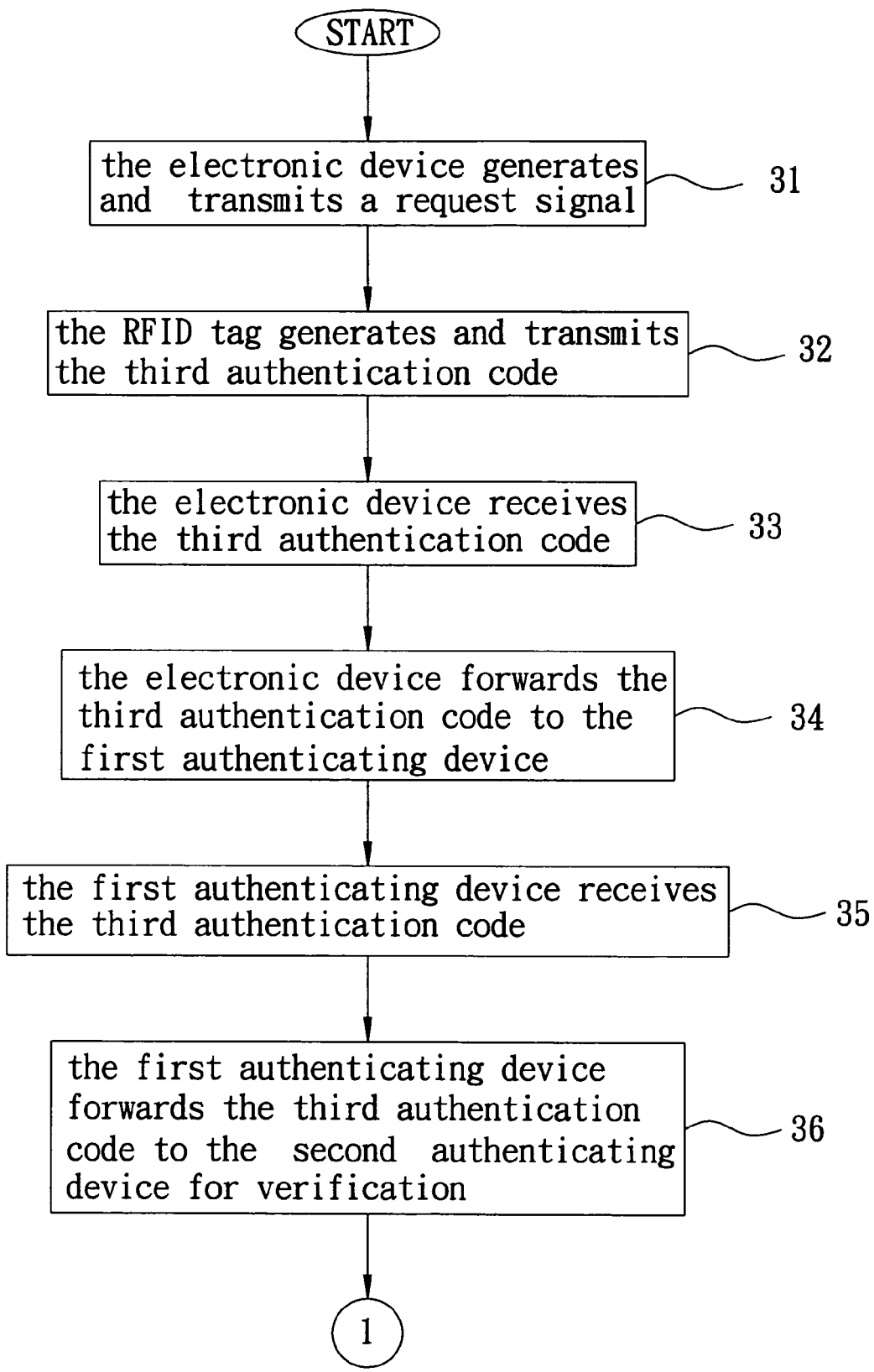
FIGS. 2A and 2B are flowcharts of the first preferred embodiment of a method for verifying authenticity of an object according to the present invention.
Figure 2B:
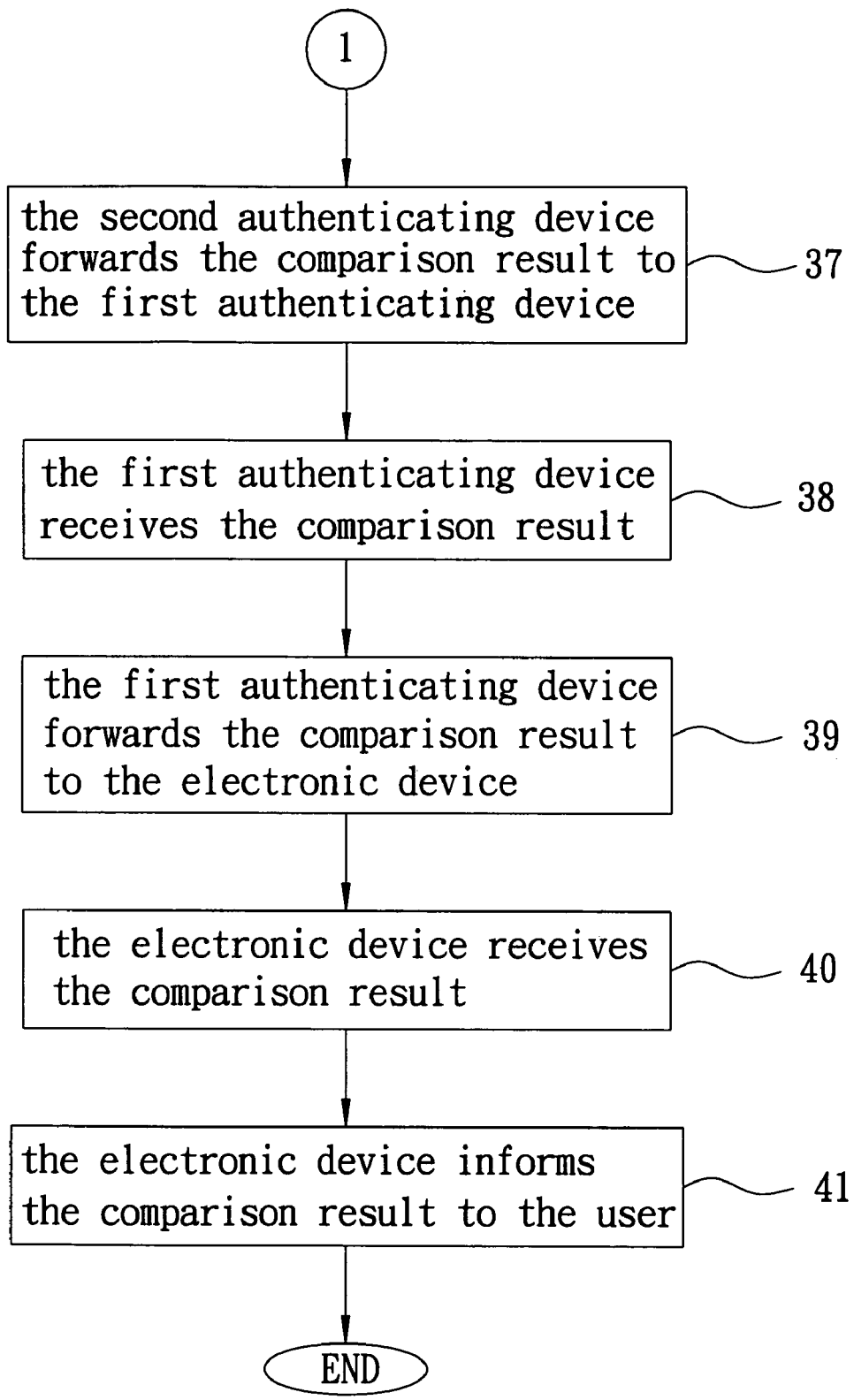

The first preferred embodiment of a method for verifying authenticity of the object to be implemented using the aforementioned system 1 includes the steps shown in FIGS. 2A and 2B.

In step 31, the first processing unit 61 of the electronic device 6 generates the request signal, and controls the first transceiving unit 62 of the electronic device 6 to wirelessly transmit the request signal.

In step 32, in response to the request signal, the RFID tag 5 generates the varying secret key, the first authentication code based on the varying secret key, the second authentication code based on the unique identification code of the RFID tag 5 and the varying secret key, and the third authentication code that is based on the first and second authentication codes and the unique identification code of the RFID tag 5, and wirelessly transmits the third authentication code.

It is noted that the varying secret key varies each time that it is generated. In this embodiment, the varying secret key is a function of date and time. That is, when the RFID tag 5 receives the request signal from the electronic device 6 on May 17, 2006 at 12:00:30 AM, the RFID tag 5 generates the varying secret key in a format "yyyymmddhhmmss" to obtain "20060517120030". The RFID tag 5 generates the first authentication code as a reversed order of digits of the varying secret key to obtain "03002171506002". Moreover, the RFID tag 5 generates the second authentication code by appending the varying secret key to the unique identification code (e.g. 123456) of the RFID tag 5 to obtain "12345620060517120030". Further, the RFID tag 5 generates the third authentication code by stringing together the unique identification code of the RFID tag 5 and the first and second authentication codes to obtain "12345603002171506002123456200605171220030".

In step 33, the first transceiving unit 62 of the electronic device 6 receives the third authentication code transmitted by the RFID tag 5.

In step 34, the first processing unit 61 of the electronic device 6 controls the first transceiving unit 62 of the electronic device 6 to forward the third authentication code received in step 33 to the authenticating center 7 for verification.

In step 35, the second transceiving unit 712 of the first authenticating device 71 of the authenticating center 7 receives the third authentication code forwarded by the electronic device 6.

In step 36, the second processing unit 711 of the first authenticating device 71 controls the second transceiving unit 712 of the first authenticating device 71 to forward the third authentication code received in step 35 to the second authenticating device 72 of the authenticating center 7.

It is noted that the first authenticating device 71 may be used in conjunction with different second authenticating devices 72 administered by different product manufacturers. In this case, the unique identification code of the RFID tag 5 should have a first code portion, e.g., "123", to identify the manufacturer, and a second code portion, e.g., "456", to identify the manufacturer's product.

It is also noted that the actual algorithms to generate the inter-related varying secret key, the first authentication code, the second authentication code, and the third authentication code may vary among the different product manufactures in accordance with the requirement of the latter.

In step 37, the third processing unit 721 of the second authenticating device 72 of the authenticating center 7 determines the unique identification code of the RFID tag 5 and the first and second authentication codes from the third authentication code received in step 36, generates the verifying code that is based on two of the unique identification code of the RFID tag 5 and the first and second authentication codes, compares the verifying code with the remaining one of the unique identification code of the RFID tag 5 and the first and second authentication codes in order to verify the object, and controls the third transceiving unit 722 of the second authenticating device 72 to forward the comparison result to the first authenticating device 71.

In this embodiment, the third processing unit 721 of the second authenticating device 72 of the authenticating center 7 generates the verifying code, i.e., "12345620060517120030", based on the unique identification code of the RFID tag 5, i.e., "123456", and the first authentication code, i.e., "03002171506002".

In step 38, the second transceiving unit 712 of the first authenticating device 71 receives the comparison result forwarded by the third transceiving unit 722 of the second authenticating device 72.

In step 39, the second processing unit 711 of the first authenticating device 71 controls the second transceiving unit 712 of the first authenticating device 71 of the authenticating center 7 to forward the comparison result to the electronic device 6.

In step 40, the first transceiving unit 62 of the electronic device 6 receives the comparison result forwarded by the second transceiving unit 712 of the first authenticating device 71 of the authenticating center 7.

In step 41, the first processing unit 61 of the electronic device 6 controls the informing unit 63 of the electronic device 6 to inform the comparison result to the user (not shown).

Figure 3:
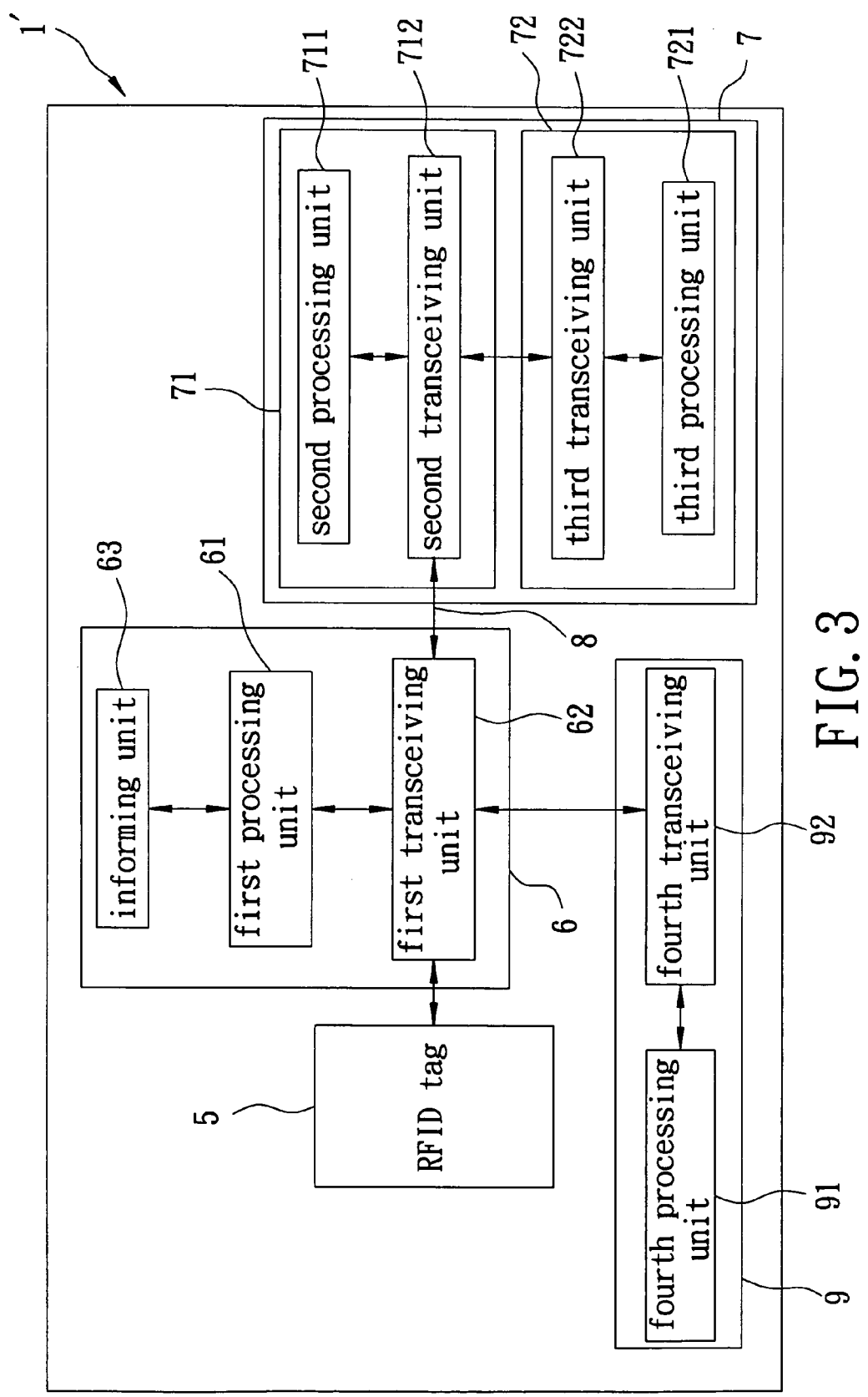
FIG. 3 is a block diagram of the second preferred embodiment of a system for verifying authenticity of an object according to the present invention.

FIG. 3 illustrates the second preferred embodiment of a system 1' for verifying authenticity of the object according to this invention. When compared with the previous embodiment, the first processing unit 61 of the electronic device 6 is further operable so as to generate an inquiry signal. The first transceiving unit 62 of the electronic device 6 is further controlled by the first processing unit 61 of the electronic device 6 to transmit the inquiry signal. The system 1' further includes a code-generating device 9 that includes a fourth processing unit 91 and a fourth transceiving unit 92. The fourth processing unit 91 of the code-generating device 9, in response to the inquiry signal, generates the varying secret key. The fourth transceiving unit 92 of the code-generating device 9 is coupled to and controlled by the fourth processing unit 91 of the code-generating device 9 to transmit the varying secret key for reception by the electronic device 6. In this embodiment, the request signal transmitted by the electronic device 6 for reception by the RFID tag 5 contains the varying secret key. In other words, the algorithm for generating the varying secret key is not present in the RFID tag 5.

In an alternative embodiment, the authenticating center 7 further includes the code-generating device 9.

Figure 4A:
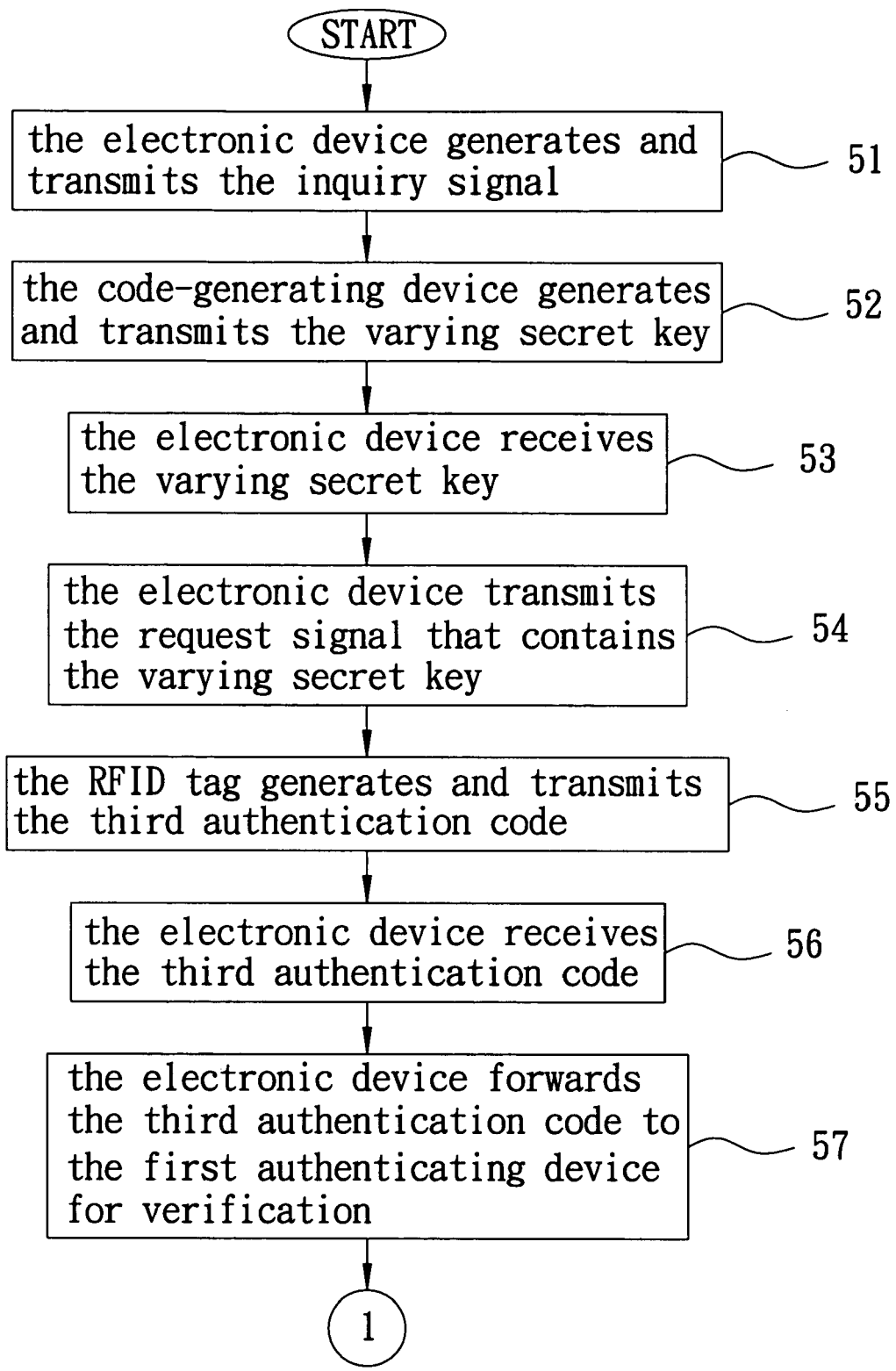
FIGS. 4A and 4B are flowcharts of the second preferred embodiment of a method for verifying authenticity of an object according to the present invention.
Figure 4B:
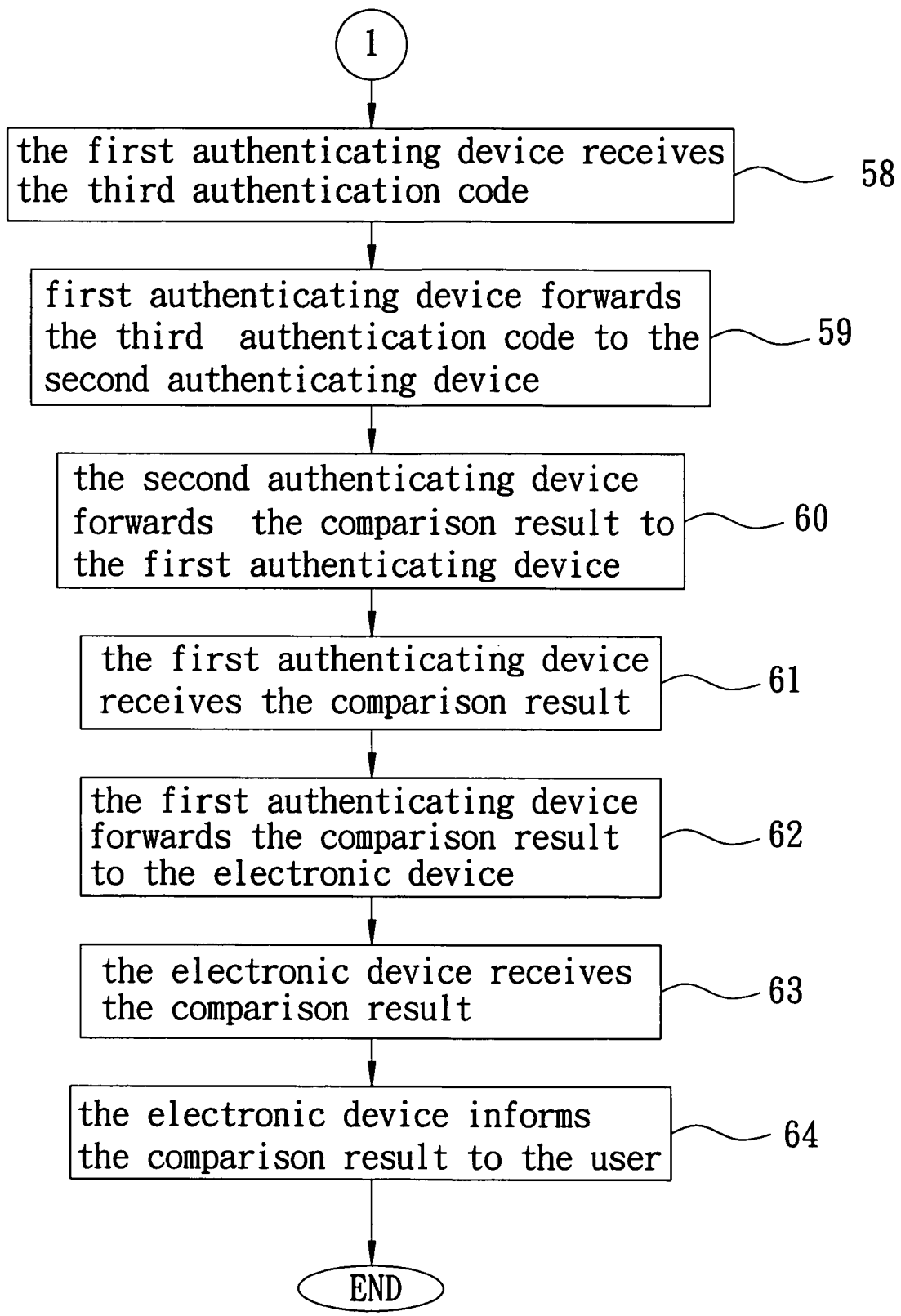

The second preferred embodiment of a method for verifying authenticity of the object to be implemented using the aforementioned system 1' according to this invention includes the steps shown in FIGS. 4A and 4B.

In step 51, the first processing unit 61 of the electronic device 6 generates the inquiry signal, and controls the first transceiving unit 62 of the electronic device 6 to transmit the inquiry signal.

In step 52, in response to the inquiry signal, the fourth processing unit 91 of the code-generating device 9 generates and transmits the varying secret key.

In step 53, the first transceiving unit 62 of the electronic device 6 receives the varying secret key transmitted by the code-generating device 9.

In step 54, the first processing unit 61 of the electronic device 6 controls the first transceiving unit 62 of the electronic device 6 to wirelessly transmit the request signal that contains the varying secret key.

In step 55, in response to the request signal, the RFID tag 5 generates the first authentication code based on the varying secret key, the second authentication code based on the unique identification code of the RFID tag 5 and the varying secret key, and the third authentication code that is based on the first and second authentication codes and the unique identification code of the RFID tag 5, and wirelessly transmits the third authentication code.

In step 56, the first transceiving unit 62 of the electronic device 6 receives the third authentication code transmitted by the RFID tag 5.

In step 57, the first processing unit 61 of the electronic device 6 controls the first transceiving unit 62 of the electronic device 6 to forward the third authentication code received in step 56 to the authenticating center 7 for verification.

In step 58, the second transceiving unit 712 of the first authenticating device 71 of the authenticating center 7 receives the third authentication code forwarded by the electronic device 6.

In step 59, the second processing unit 711 of the first authenticating device 71 controls the second transceiving unit 712 of the first authenticating device 71 to forward the third authentication code received in step 58 to the second authenticating device 72 of the authenticating center 7.

In step 60, the third processing unit 721 of the second authenticating device 72 of the authenticating center 7 determines the unique identification code of the RFID tag 5 and the first and second authentication codes from the third authentication code forwarded by the first authenticating device 71, generates the verifying code that is based on two of the unique identification code of the RFID tag 5 and the first and second authentication codes, compares the verifying code with the remaining one of the unique identification code of the RFID tag 5 and the first and second authentication codes in order to verify the object, and controls the third transceiving unit 722 of the second authenticating device 72 to forward the comparison result to the first authenticating device 71.

In step 61, the second transceiving unit 712 of the first authenticating device 71 receives the comparison result forwarded by the third transceiving unit 722 of the second authenticating device 72.

In step 62, the second processing unit 711 of the first authenticating device 71 controls the second transceiving unit 712 of the first authenticating device 71 of the authenticating center 7 to forward the comparison result to the electronic device 6.

In step 63, the first transceiving unit 62 of the electronic device 6 receives the comparison result forwarded by the second transceiving unit 712 of the first authenticating device 71 of the authenticating center 7.

In step 64, the first processing unit 61 of the electronic device 6 controls the informing unit 63 of the electronic device 6 to inform the comparison result to the user (not shown).

The method and system of this invention can be applied to provide proof of authenticity of goods sold over the Internet. In such an application, the electronic device 6 is capable of accessing the Internet and, after receiving the comparison result from the authenticating center 7, can be operated to upload the comparison result to an online marketplace (such as a bidding website) such that the comparison result forms a part of an item description web page for the object that is associated with the RFID tag and that is being sold by a seller through the online marketplace. Therefore, interested buyers who access the item description web page can be provided with a proof of authenticity of the object, i.e., the buyers can rest assured that the object being sold is authentic.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for verifying authenticity of an object to be implemented using a system that includes a radio frequency identification (RFID) tag associated with the object, an electronic device, and an authenticating center, said method comprising the steps of:
   (A) enabling the electronic device to generate and wirelessly transmit a request signal;
   (B) in response to the request signal, enabling the RFID tag to generate a first authentication code based on a varying secret key, a second authentication code based on a unique identification code of the RFID tag and the varying secret key, and a third authentication code that is based on the unique identification code of the RFID tag and the first and second authentication codes, and to wirelessly transmit the third authentication code for reception by the electronic device; and
   (C) enabling the electronic device to forward the third authentication code received from the RFID tag to the authenticating center for verification.

2. The method as claimed in claim 1, further comprising the step of:
   (D) enabling the authenticating center to determine the unique identification code of the RFID tag and the first and second authentication codes from the third authentication code forwarded by the electronic device, to generate a verifying code that is based on two of the unique identification code of the RFID tag and the first and second authentication codes, to compare the verifying code with the remaining one of the unique identification code of the RFID tag and the first and second authentication codes in order to verify authenticity of the object, and to forward a comparison result to the electronic device.

3. The method as claimed in claim 2, further comprising the step of enabling the electronic device to inform the comparison result to a user.

4. The method as claimed in claim 3, wherein the electronic device is operable in at least one of a forward mode, where the electronic device forwards the comparison result to a preset email account of the user automatically, and an upload mode, where the electronic device uploads the comparison result to an Internet website automatically.

5. The method as claimed in claim 2, wherein, in step (D), the electronic device receives the comparison result from the authenticating center via one of a wireless connection and a wired connection.

6. The method as claimed in claim 5, wherein the wireless connection is one of an Internet connection and a short message service, and the wired connection is one of an Ethernet connection and a bus connection.

7. The method as claimed in claim 2, wherein, in step (D), the authenticating center includes first and second authenticating devices, the first authenticating device being located at a service provider that administers the system, the second authenticating device being locate at a manufacturer of the object, the first authenticating device forwarding the third authentication code received from the electronic device to the second authenticating device for verification.

8. The method as claimed in claim 1, wherein, in step (B), the varying secret key is generated by the RFID tag.

9. The method as claimed in claim 1, wherein, in step (A), the request signal contains the varying secret key.

10. The method as claimed in claim 1, wherein, in step (C), the electronic device forwards the third authentication code to the authenticating center via one of a wireless connection and a wired connection.

11. The method as claimed in claim 10, wherein said wireless connection is one of an Internet connection and a short message service, and said wired connection is one of an Ethernet connection and a bus connection.

12. A system for verifying authenticity of an object, comprising:
   a radio frequency identification (RFID) tag associated with the object and having a unique identification code;
   an electronic device operable so as to generate and wirelessly transmit a request signal; and
   an authenticating center;
   wherein, in response to the request signal, said RFID tag generates a first authentication code based on a varying secret key, a second authentication code based on the unique identification code of said RFID tag and the varying secret key, and a third authentication code that is based on the unique identification code of said RFID tag and the first and second authentication codes, and wirelessly transmits the third authentication code for reception by said electronic device; and
   wherein said electronic device forwards the third authentication code received from said RFID tag to said authenticating center for verification.

13. The system as claimed in claim 12, wherein said authenticating center is operable so as to determine the unique identification code of said RFID tag and the first and second authentication codes from the third authentication code forwarded by said electronic device, so as to generate a verifying code that is based on two of the unique identification code of said RFID tag and the first and second authentication codes, so as to compare the verifying code with the remaining one of the unique identification code of said RFID tag and the first and second authentication codes in order to verify authenticity of the object, and so as to forward a comparison result to said electronic device.

14. The system as claimed in claim 13, wherein said electronic device is further operable so as to inform the comparison result forwarded by said authenticating center to a user.

15. The system as claimed in claim 14, wherein said electronic device is further operable in a least one of a forward mode, where the electronic device forwards the comparison result to a preset email account of the user automatically, and an upload mode, where the electronic device uploads the comparison result to an Internet website automatically.

16. The system as claimed in claim 13, wherein said authenticating center forwards the comparison result to said electronic device via one of a wireless connection and a wired connection.

17. The system as claimed in claim 16, wherein said wireless connection is one of an Internet connection and a short message service, and said wired connection is one of an Ethernet connection and a bus connection.

18. The system as claimed in claim 12, wherein said RFID tag further generates the varying secret key in response to the request signal.

19. The system as claimed in claim 12, wherein the request signal contains the varying secret key.

20. The system as claimed in claim 19, wherein said electronic device is further operable so as to generate and transmit an inquiry signal, said system further comprising a code-generating device that generates and transmits the varying secret key to said electronic device in response to the inquiry signal.

21. The system as claimed in claim 12, wherein said electronic device forwards the third authentication code to said authenticating center via one of a wireless connection and a wired connection.

22. The system as claimed in claim 21, wherein said wireless connection is one of an Internet connection and a short message service, and said wired connection is one of an Ethernet connection and a bus connection.

23. The system as claimed in claim 12, wherein said authenticating center includes first and second authenticating devices, said first authenticating device being located at a service provider that administers the system, said second authenticating device being located at a manufacturer of the object, said first authenticating device forwarding the third authentication code received from said electronic device to said second authenticating device for verification.

\* \* \* \* \*

UNITED STATES PATENT AND TRADEMARK OFFICE
CERTIFICATE OF CORRECTION

PATENT NO. : 7,602,291 B2  Page 1 of 1
APPLICATION NO. : 11/520706
DATED : October 13, 2009
INVENTOR(S) : Tseng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 393 days.

Signed and Sealed this

Fifth Day of October, 2010

David J. Kappos
*Director of the United States Patent and Trademark Office*